United States Patent
Marcellin et al.

(10) Patent No.: US 7,724,964 B2
(45) Date of Patent: *May 25, 2010

(54) DIGITAL INTERMEDIATE (DI) PROCESSING AND DISTRIBUTION WITH SCALABLE COMPRESSION IN THE POST-PRODUCTION OF MOTION PICTURES

(75) Inventors: Michael W. Marcellin, Tucson, AZ (US); Ali Bilgin, Tucson, AZ (US)

(73) Assignee: DTS AZ Research, LLC, Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/524,650

(22) Filed: Sep. 21, 2006

(65) Prior Publication Data

US 2007/0014476 A1 Jan. 18, 2007

(51) Int. Cl.
*G06K 9/36* (2006.01)
(52) U.S. Cl. .................................... 382/232
(58) Field of Classification Search ......... 382/232–236, 382/238–240, 244–250; 709/229–232, 240–247; 375/240.01–240.03, 240.11, 240.18–240.25; 358/1.2, 420.01–420.16
See application file for complete search history.

(56) References Cited

U.S. PATENT DOCUMENTS

| 5,577,191 | A | 11/1996 | Bonomi |
| 6,522,418 | B2 | 2/2003 | Yokomizo et al. |
| 6,633,673 | B1 | 10/2003 | Shen |
| 6,870,547 | B1 | 3/2005 | Crosby et al. |
| 7,079,690 | B2 * | 7/2006 | Boliek et al. ............. 382/232 |
| 7,110,605 | B2 * | 9/2006 | Marcellin et al. ........ 382/232 |
| 7,149,370 | B2 * | 12/2006 | Willner et al. ............ 382/305 |
| 7,206,804 | B1 * | 4/2007 | Deshpande et al. ....... 709/203 |
| 7,245,241 | B2 * | 7/2007 | Cai et al. .................. 341/107 |
| 2002/0063717 | A1 | 5/2002 | Minner et al. |
| 2003/0215146 | A1 | 11/2003 | Schwartz |

OTHER PUBLICATIONS

ITU-T Rec. T.800/ISO/IEX 15444-1:2004 "JPEG 2000 Image Coding".
JPEG2000 Image Coding System, 2004, DS Taubman and M.W. Marcellin, in JPEG2000: Image Compression Fundamentals, Practice and Standards, Kluwer Publishing 2002.

* cited by examiner

*Primary Examiner*—Jose L Couso
(74) *Attorney, Agent, or Firm*—Blake Welcher; William Johnson; Eric Gifford (57) ABSTRACT

Scalable image compression is exploited to facilitate the creative process in the post-production of motion pictures. Specifically, digital intermediate (DI) processing of motion pictures is enabled by dynamically rendering proxies 126 (steps 122, 124, 128) in response to client requests (steps 116, 118). A DI application is designed to enhance the efficiency of post-processing and the quality of the work product of the editors, colorists and other creative people. The DI application also provides a method for efficiently formatting the product for film, digital cinema, DVD and other video applications.

23 Claims, 9 Drawing Sheets

DIGITAL INTERMEDIATE (DI) PROCESSING AND DISTRIBUTION WITH SCALABLE COMPRESSION IN THE POST-PRODUCTION OF MOTION PICTURES

CROSS-REFERENCE TO RELATED APPLICATION

This application claims benefit of priority under 35 USC 120 to U.S. application Ser. No. 11/051,771 entitled "Digital Intermediate (DI) Processing and Distribution with Scalable Compression in the Post-Production of Motion Pictures" filed on Feb. 04, 2005 and to International Application No. PCT/US2006/002747 entitled "Digital Intermediate (DI) Processing and Distribution with Scalable Compression in the Post-Production of Motion Pictures" filed on Jan. 25, 2006 the entire contents of which are incorporated by reference.

BACKGROUND OF THE INVENTION

1. Field of the Invention

This invention relates to the workflow employed in the creation of motion pictures and video and more specifically to the tasks encountered in digital intermediate processing in the post-production of motion pictures.

2. Description of the Related Art

Digital Intermediate (DI) Processing

While a small but growing number of motion pictures are being recorded and/or exhibited using digital cameras and/or digital projectors, most motion pictures are recorded and exhibited using film. Even though a motion picture may be recorded and exhibited using film, a large and growing number of motion pictures are employing digital processing techniques in post-production. This processing is known as digital intermediate (DI) processing. Examples of post-processing include: editing (deciding which images will be included and in what order), color correction, special effects, pan & scan, sub-titles, shot separation, re-framing, scene classification, artifact removal, resolution enhancement, noise reduction, sharpening, and verification. After DI processing, the images are recorded back to film to create the various prints involved in the mastering and distribution of motion pictures.

The DI process creates a reduced resolution "proxy" of each image for post-processing. This is done by down sampling the digital image to a fixed resolution. Each down sampled version is then compressed at a fixed quality level and the compressed proxies are stored. The selection of the resolution and quality level represents a tradeoff among processing power, storage capacity, display capability and the requirements of the various editing functions. When a post-processor (editor, colorist, etc.) requests a certain scene or cut, the corresponding compressed images are decompressed to display the sequence of proxies. The proxies are distinct digital images, created from, but entirely separate from the digital versions of the original images. Storage of the compressed proxies is required in addition to storage of the digital versions of the original images. Post-processing generates one or more decision lists that include a list of the operations that were carried out on each of the proxies. Once editing, color correction etc., are completed on the proxies, the decision lists are applied to the digital images so that the same operations are carried out on the digital versions of original images.

U.S. Pat. No. 5,577,191 describes a digital video editing and publishing system in which digital video data are compressed, intraframe-only, and stored. Selected frames of the compressed data are decompressed, edited and recompressed. The edited and compressed video sequence is decompressed and then recompressed using both intraframe and interframe compression. The parameters of the intraframe compression used in creating this digital master file are set such that the decompressed image is of a selected resolution and quality commensurate with the target publication medium. This approach combines the ability to decompress and edit individual frames by using intraframe compression only initially and the superior compression capability of intraframe and interframe compression. This approach does not utilize a proxy for editing. Consequently, if the target publication medium is of very high resolution the editing process may be very cumbersome.

JPEG2000 is the new international image compression standard (ISO/IEC 15444) and offers state-of-the-art compression performance for still imagery and a number of functionalities designed to specifically address the transmission and storage requirements of emerging imaging applications. In particular, JPEG2000 offers several mechanisms to provide for scalability and random access into compressed codestreams to reduce the amount of data to be transmitted during distribution of large digital images. Specifically, low resolution versions, reduced spatial regions, and reduced quality images or combinations thereof can be extracted from the codestream. To this end, the image data are compressed and stored in packets in the codestreams.

The JPEG2000 features were developed to facilitate transmission of large images such as for storage and distribution of medical imagery. Additionally, JPEG2000 is being used for distributing large overhead images as well as maps. These images and maps can be viewed in an interactive way to reveal different spatial regions at resolutions desired by the user. The library of congress is considering using JPEG2000 to allow users to browse archival imagery over the internet. Significantly, JPEG2000 has been selected for the distribution of Digital Motion Pictures. This selection was based largely on the fact that a single file can serve both high resolution, as well as medium resolution projectors. Specifically, the entire file may be suitable for a high resolution projector. Alternately, medium resolution imagery can be extracted (at the theater) for use by a medium resolution projector.

SUMMARY OF THE INVENTION

The present invention provides for the exploitation of scalable image compression to facilitate the creative process in the post-production of motion pictures. Specifically, the present invention enables digital intermediate (DI) processing of motion pictures by dynamically rendering proxies in response to client requests. A DI application is designed to enhance the efficiency of post-processing and the quality of the work product by providing the editors, colorists and other creative people the capability to select the regions, resolution and quality level of the proxy video clips they process. The DI application also provides a method for efficiently applying decision lists to the full (non-proxy) version of the compressed codestream or the uncompressed images, as well as formatting the edited product for film, digital cinema, DVD and other video applications.

Digital images from a motion picture are compressed at a very high quality, perhaps lossless, using a scalable compression algorithm such as JPEG2000 and stored as a compressed codestream. The uncompressed digital images and/or compressed codestreams are archived. From their PC or workstation, the post-processor will make a request for a certain number of frames, a specific spatial region within the frames, and a desired reduced resolution and/or a desired reduced quality level.

In response, the DI application extracts and decompresses the packets required to render the proxy images at the requested spatial region, resolution and quality on the post-processor's workstation. This enables the editor, colorist, special effects artists, etc. to tailor the proxies they view to their specific and changing needs and personal preferences and the changing content of the motion picture. Furthermore, they can change their request to view different regions, resolutions or quality levels and may even simultaneously request two or more different views of the same image or sequence of images. The proxies are generated dynamically as needed from the compressed stored images themselves. No fixed proxies are created or stored.

Post-processing generates a decision list or lists that include all of the operations that were performed on the dynamic proxies (editing, color correction, special effects, titles, etc.). The decision lists can be applied to the digital images for each post-processing function or after all post-processing functions are complete. They may be applied to the compressed codestream or the uncompressed digital images. The list can be applied to the codestream by extracting packets including packets used to render the proxy image and additional packets for resolution and/or quality levels not rendered in the proxy image, decompressing the packets, performing the post-processing operations per the decision list, recompressing the data and inserting the packets back into the stored codestream at the appropriate locations. Alternately, each decision list may be applied to the compressed codestream at the completion of a particular function and then after all post-processing functions are complete all of decision lists may be applied to the uncompressed digital images to render the digital master.

These and other features and advantages of the invention will be apparent to those skilled in the art from the following detailed description of preferred embodiments, taken together with the accompanying drawings, in which:

DETAILED DESCRIPTION OF THE INVENTION

The present invention provides for digital intermediate (DI) processing by dynamically rendering proxies in response to client requests.

The features of scalable codecs such as JPEG2000 can be exploited to perform DI processing employing high resolution/high quality compressed images in accordance with the present invention. While the invention is described with respect to JPEG2000 it is clear that any image representation having similar scaling properties may be used. For example, efforts have begun within MPEG (Motion Picture Experts Group) on a project known as SVC (scalable video coding). Similarly, while the invention is described for DI processing (assuming film capture), it is clear that the invention is applicable when video cameras, digital cinema cameras or other electronic capture and/or recording devices are employed. In this case, the digital data may be compressed on-camera using JPEG2000, or compressed post capture (also using JPEG2000). Such compression may be very high quality (perhaps lossless). Finally, although the DI process is described in the context of a Client-Server network it is to be understood that other configurations are possible. For example, all of the storage, processing, creation and distribution steps may be performed by a single software application operating on a single computer.

At the very high 2 k and 4 k resolutions associated with film, the compression performance of JPEG2000 rivals or exceeds the compression performance of other traditional and state-of-the-art video coders. For the highest resolution digital applications such as digital cinema exhibition, JPEG2000 can be used to both perform the DI process and to distribute the motion picture. For lower resolution digital applications such as DVD, videotape, TV, JPEG2000 may be used to perform the DI process with another video coder (MPEG, WM-9) used for distribution.

Figure 1:
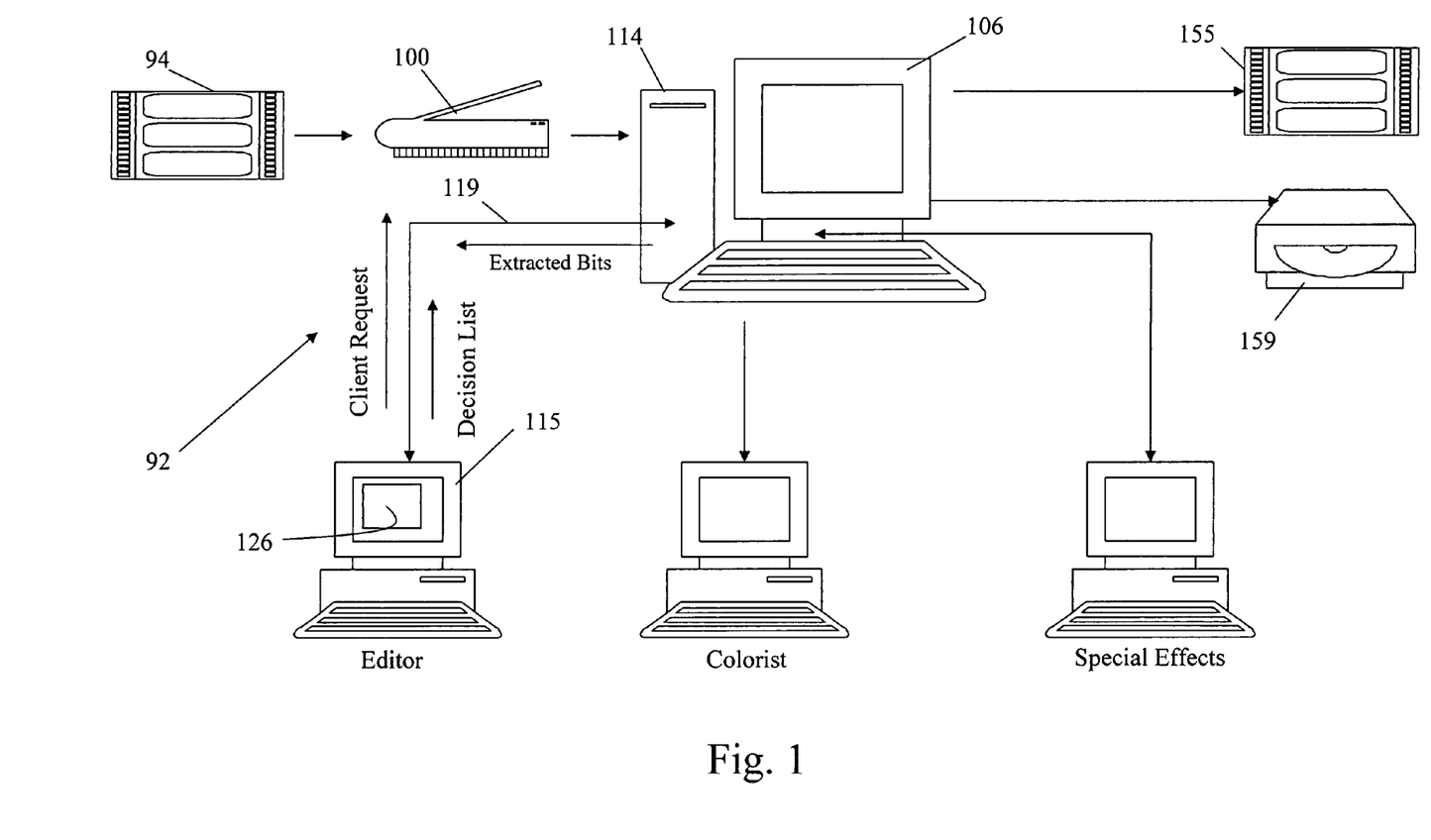
FIG. 1 is a block diagram of a client-server network for DI processing in accordance with the present invention.
Figure 2:
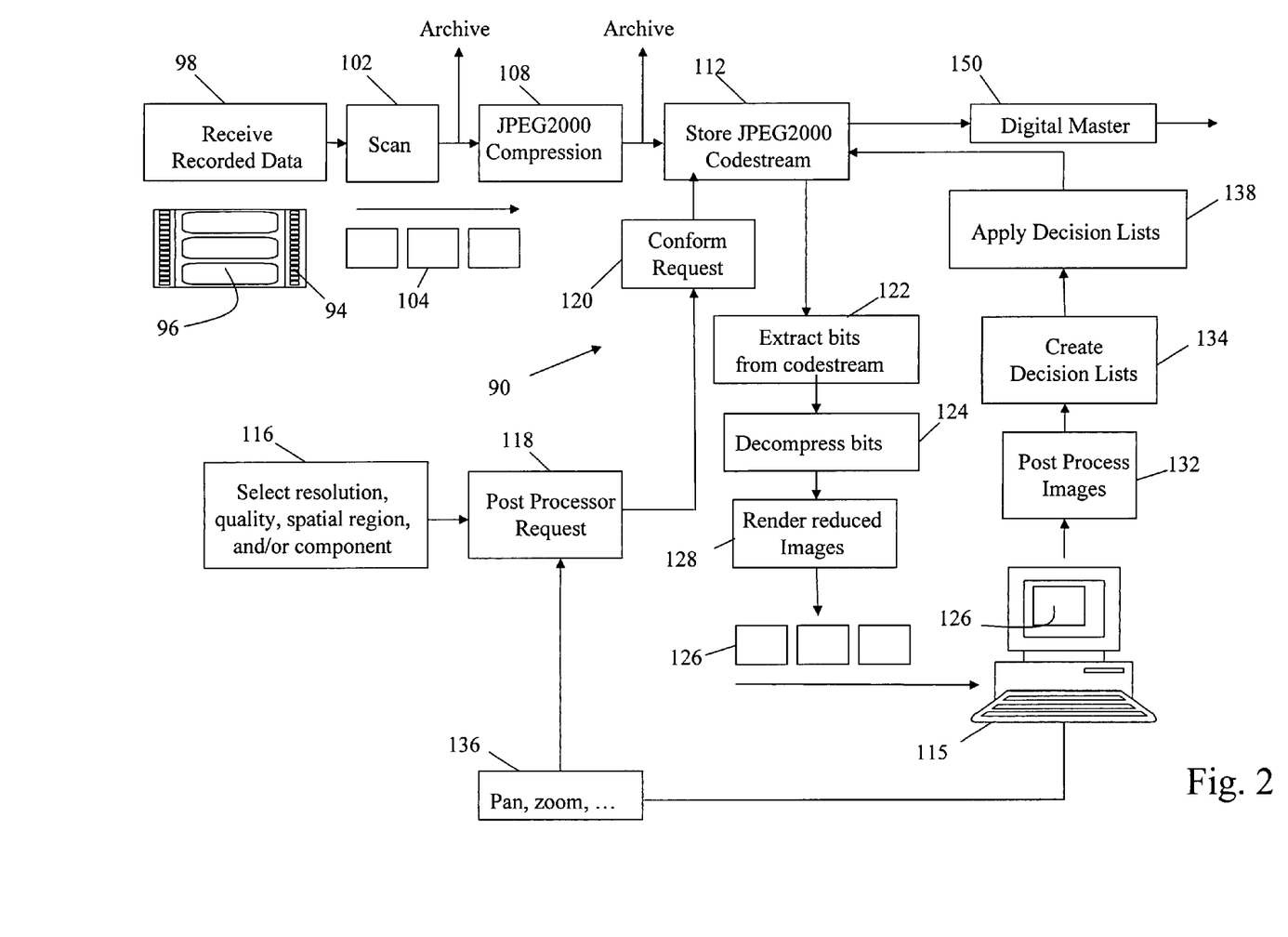
FIG. 2 is a flowchart of a DI process using JPEG2000 for film and digital cinema exhibition in accordance with the present invention.

As shown in FIGS. 1 and 2, a DI application 90 is implemented in a client-server architecture 92 to perform DI processing on high resolution/high quality compressed images by exploiting the scalability and random access features of JPEG2000. A post-house is typically provided with original recorded data (film 94) consisting of a sequence of images 96 (step 98). A scanner 100 scans each image 96 (step 102) to create a digital image 104. A server 106 compresses the sequence of digital images using JPEG2000 (or a similar scalable coder) (step 108) at a very high quality, possibly lossless, and stores the compressed codestream 110 (see FIG. 3) (step 112) in mass storage 114. The original uncompressed and/or compressed digital images are typically archived for safe keeping.

A "post-processor" working at his or her client workstation 115 selects the desired frames of a film, chooses the resolution, spatial region, quality level and/or color component (step 116) and issues a request (step 118). A default initial request might be to retrieve all desired frames at full spatial extent, a reduced resolution, medium quality, and all color components. The postprocessor may make multiple simultaneous and different requests from the same codestream. For example, the post-processor may want to view a low res version of the entire image concurrently with a high res version of a particular region of the image. The post-processor may work on one, some or all of the rendered images simultaneously or in sequence. Furthermore, in some cases, multiple post-processors (editors, colorists, special effects people, etc.) can make different requests simultaneously.

The client workstation 115 may be collocated with the server 106 in, for example, a post-house, or remotely located at, for example, the post-processor's own studio or home. In either case, the server must transmit a lot of data over a communications channel 119, e.g. Ethernet, firewire, internet, etc. For remote clients, the communications channel may be "band limited", e.g. too slow to transmit the data to dynamically render the requested proxies in an interactive work environment. One approach would be to download the entire compressed codestream to the remote client's workstation off-line and then proceed as already described. However, this approach would take a lot of time, require the client to have sufficient storage for the entire film and would release the entire codestream from the control of the post-house. Alternately, the post-processor sends an initial client request to the server specifying one or more scenes and possibly the post-processing step that will be performed. The server extracts the packets for those scenes at a reduced resolution and/or quality level and transmits them over the band limited channel to the remote client workstation. The reduced resolution and/or quality level may be fixed at levels that still provide very high quality images but with fewer bits or may be determined based on a priori knowledge of the channel capacity, requirements of the post-processing steps to be performed and/or the capabilities of the particular client workstation. The client receives the packets and stores them locally. Thereafter, all client requests for specific spatial regions at further reduced resolution and/or quality levels are processed locally to dynamically render the proxies. Once complete, the decision list is transmitted back to the server.

Because the post-processor has the great flexibility provided by the JPEG2000 feature set to request different regions, resolutions and quality levels, a request may be incompatible with the editing tools or sub-optimal in the sense that more information could be provided. For example, the post-processor's display may not support a 4 k image display or the workstation may not be able to render the full spatial extent of the image at high resolution and high quality for individual images and particularly at video frame rates. Postprocessors will typically view the images as both video and still frames to perform their tasks. The request can be made to conform to the system capabilities by adjusting one or more of the parameters (step 120). Alternately, a non-conforming request can be processed and made to conform at the workstation by subsampling, cropping, etc.

Figure 3:
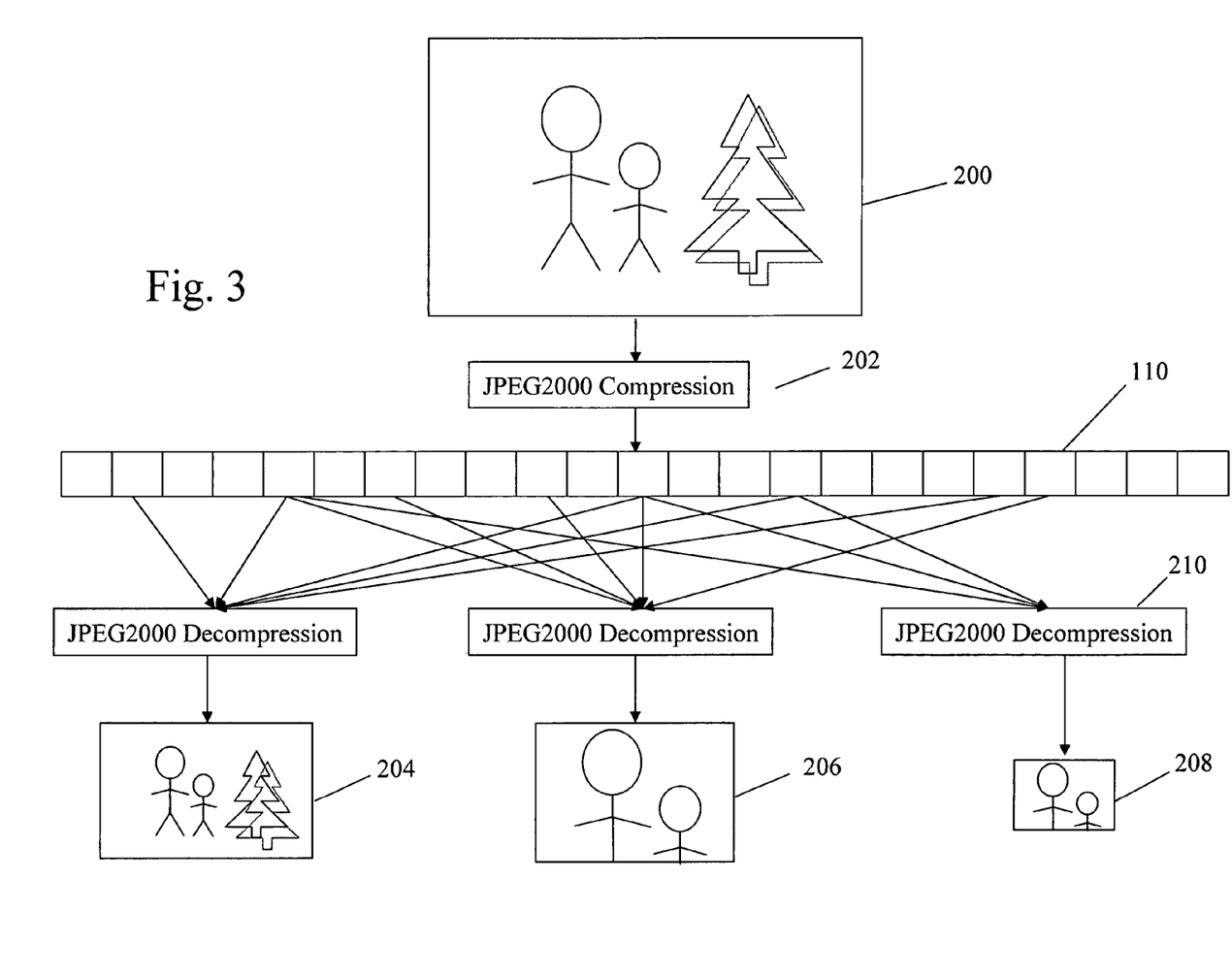
FIG. 3 illustrates the extraction of packets from the JPEG-2000 codestream to render video of different resolution, quality, spatial region and/or component.

In response to the request, the DI application extracts those packets that are required to render the desired spatial region at a specified reduced resolution, quality, or component from the codestream 110 (step 122), decompresses data from the packets (step 124) and renders them (step 128) into a sequence of reduced proxy images 126 on workstation 115. To minimize computations, in a preferred embodiment the application extracts only those packets that are required to render the proxy. On the initial request, the images are rendered directly from the decompressed packets. For subsequent requests on the same images, additional packets are extracted and added to the already existing packets, then decompressed to yield images with additional resolution, quality, spatial extent or color component.

An example of the process for extracting packets from the codestream 110 for a digital image 200 is illustrated in FIG. 3. JPEG2000 compression 202 produces a codestream 110 from which packets for a reduced resolution image 204, a reduced spatial region image 206, and a reduced spatial region and reduced resolution image 208 are extracted and decompressed 210.

The reduced digital images 126 are displayed, as stills or video sequences, on the post-processor's workstation 115. The post-processor uses a post-processing package to select and reorder frames, perform wipes, swipes, dissolves, fades, perform color correction, pan & scan, insert special effects, shot separation, re-framing, scene classification, artifact removal, resolution enhancement, noise reduction, sharpening, and verification, etc. (step 132). In many cases, these functions are performed by different people on different machines at different locations. Furthermore, some of these functions may be performed by computers with minimal or no user interaction. Each of these separate tasks generates a decision list (step 134) that records the operations performed on each reduced digital image. In performing these functions, the post-processor may wish to pan to a different portion of a frame, zoom in to a higher resolution, zoom out to the entire frame, observe various quality levels including lossless and perhaps view in black and white (step 136). Standard workstation functionality provided by the mouse, stylus etc. can be used as an interface for the reformulation (step 116) and submission of another editor request (step 118). This flexibility will greatly enhance the post-processor's efficiency and quality of the work product.

To illustrate the flexibility that the present invention brings to the DI process, assume the original images are of size 4096×2160 (4 k) and are compressed with very high quality (perhaps losslessly). When deciding which images should be included and in what order, only reduced resolution versions (such as 2048×1080) might be decompressed and displayed. Similarly, reduced quality might be employed as well. Editing decisions would be made based on reduced resolution/quality. If desired, the editor might "zoom in" to view a particular spatial region at a higher resolution. In each case, the imagery viewed by the editor is decompressed from the high resolution/high quality compressed codestream. This process generates a decision list of what images to retain and in what order.

As another example, consider color correction. Low resolution/quality versions of the images can be displayed in real-time. The colorist then works on the reduced resolution/quality versions. Once color decisions are made, they are written out to a decision list. The colorist might zoom in to get a better look at a particular spatial region. In this case, the colorist might perform correction on the zoomed in pixels. These pixels might be at full resolution, or at a resolution "in between" full resolution and the reduced resolution nominally being used to perform color correction. A similar technique might be used to spot check correction within a spatial region. After performing color correction at low resolution, the colorist might zoom in to see the results at (higher or) full resolution. The ability to zoom in to full resolution may allow the colorist to make corrections on fine details such as "red eye" that would be beyond the capability of fixed resolution proxies. Once all color correction decisions have been finalized, they are stored in a decision list for subsequent application to the full (non-reduced) compressed codestream.

As yet another example, if the original film captured a wider field-of-view than ultimately desired and the film was scanned at an even higher resolution, e.g. 5 k, the editor can pan and scan within this image to "frame" the 4 k digital image. This provides the editor, director, etc. with considerable flexibility to modify the film during the DI process without having to reshoot saving both time and money. Of course, this also applies if a digital camera is used to capture the wider field of view image at e.g., 5 k.

Figure 4:
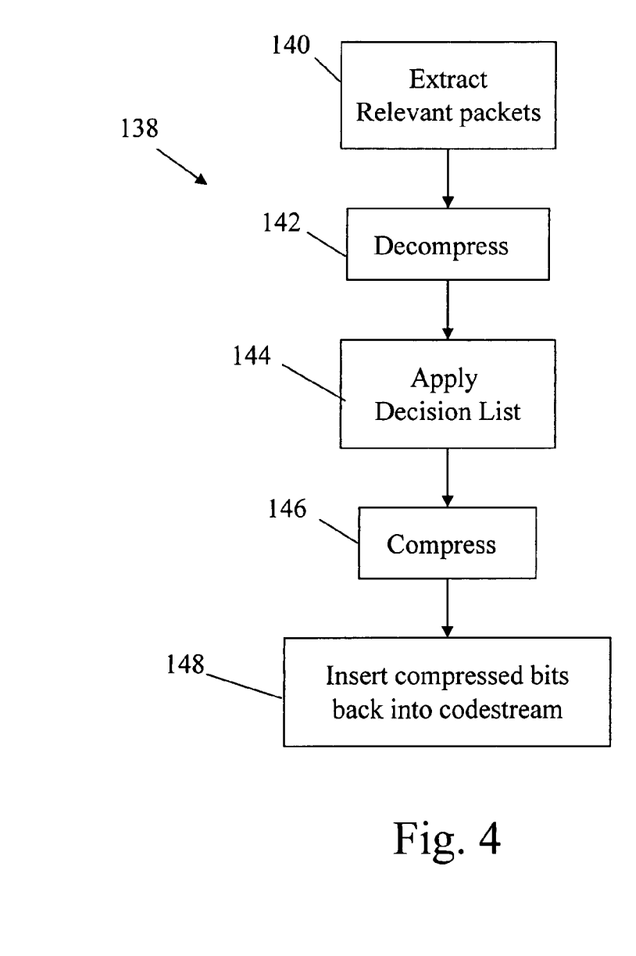
FIG. 4 is a flowchart of the steps for applying decision lists to the compressed codestream.

The DI application applies the decision list to the (non-reduced) stored codestream or the original uncompressed images to incorporate the post-processing operations (step 138). In the latter case, these processed images would then be compressed and inserted into the codestream to replace the like images. As shown in FIG. 4, to apply the lists to the codestream the DI application extracts the relevant packets from the codestream (step 140). The relevant packets include a subset of the packets extracted to render the proxy (some of the proxy packets may not be modified) plus additional packets (not extracted when rendering the proxy) if the rendered proxy was less than full (or desired output) resolution and/or quality. The DI application decompresses the extracted packets (if necessary) (step 142), performs the operations per the decision list (step 144), and recompresses the data to form modified packets (if necessary) (step 146). In most cases, some decompress/recompress will be necessary but, for example, the editing function of frame selection and reordering does not require it.

The DI application writes a codestream that includes the modified packets at the appropriate locations (step 148). In the currently preferred embodiment only modified packets are replaced in the modified codestream. Many packets in the modified codestream may remain unmodified. Modifying only corrected spatial regions avoids "noise build up" that might be experienced in existing systems where all pixels are decompressed/recompressed even when only a small spatial region is to be modified. It also avoids unnecessary computations, thus accelerating the process. However, a full decompress and recompress on the entire post-processed region or even the entire image may be performed if so desired.

Figure 5:
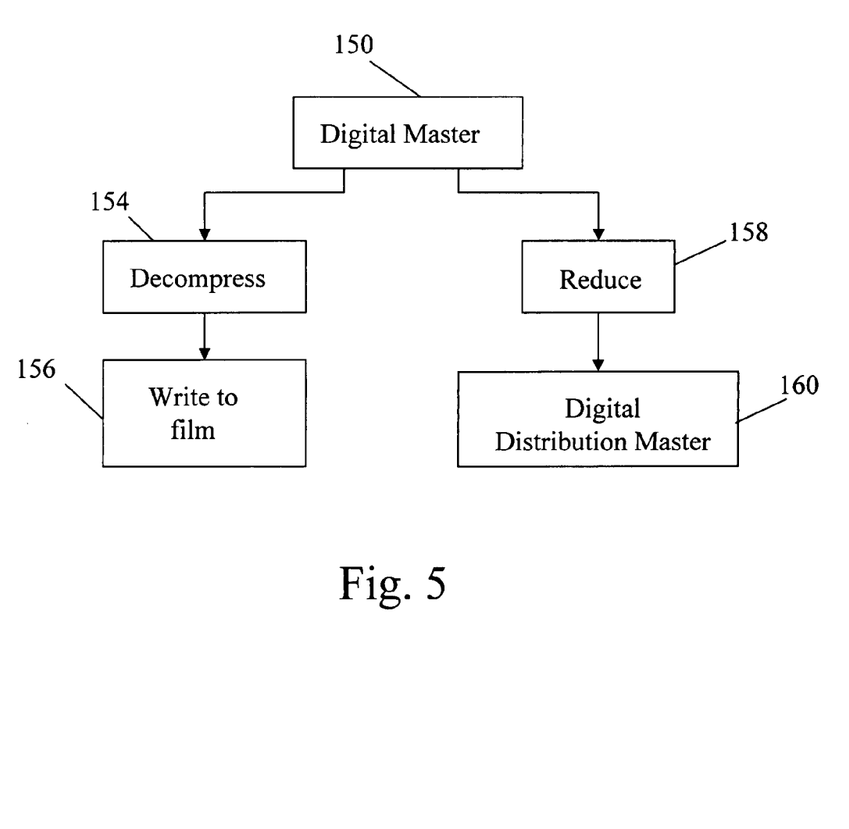
FIG. 5 is a diagram for writing the digital master to film and a digital distribution master.

The DI process is repeated for each post-processing stage. Once the last decision list has been applied, the compressed codestream is either directly output as the "digital master" 150 in a compressed format, suitably JPEG2000, or all of the decision lists are applied to the original uncompressed images, compressed and then output as the digital master. As shown in FIG. 5, the digital master 150 is decompressed (step 154) and written out to film 155 (step 156). The digital master may also be "reduced" (step 158) by either dumping bits from the codestream or transcoding it into a codestream having different JPEG2000 parameter values to provide a digital distribution master stored on suitable digital media, for example, hard disc, magnetic tape or DVD 159 for digital exhibition (step 160).

Figure 6A:
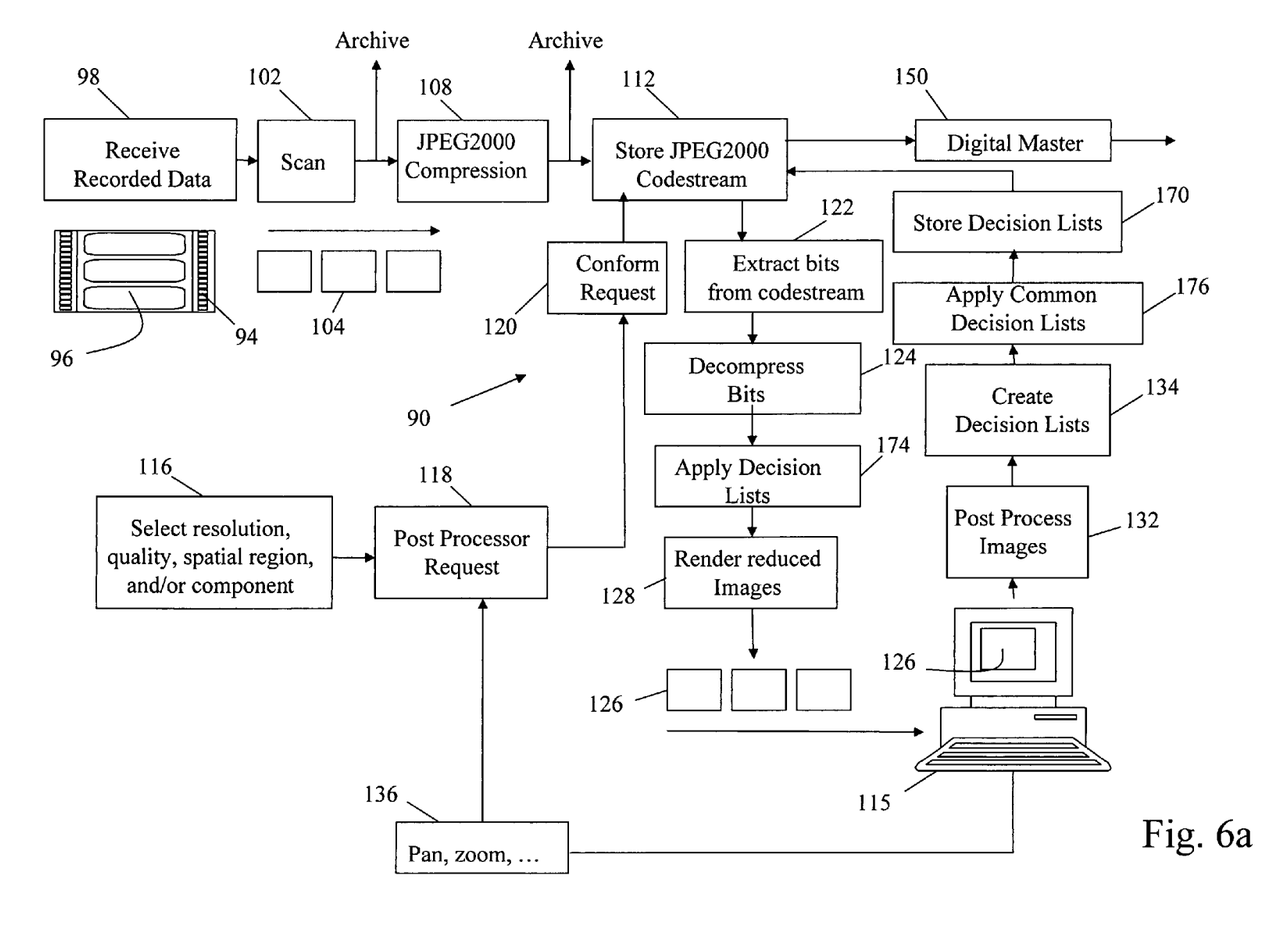
FIGS. 6a-6b and 7 are diagrams of the DI process and creation of the digital master in which some or all of the decision lists are stored.
Figure 6B:
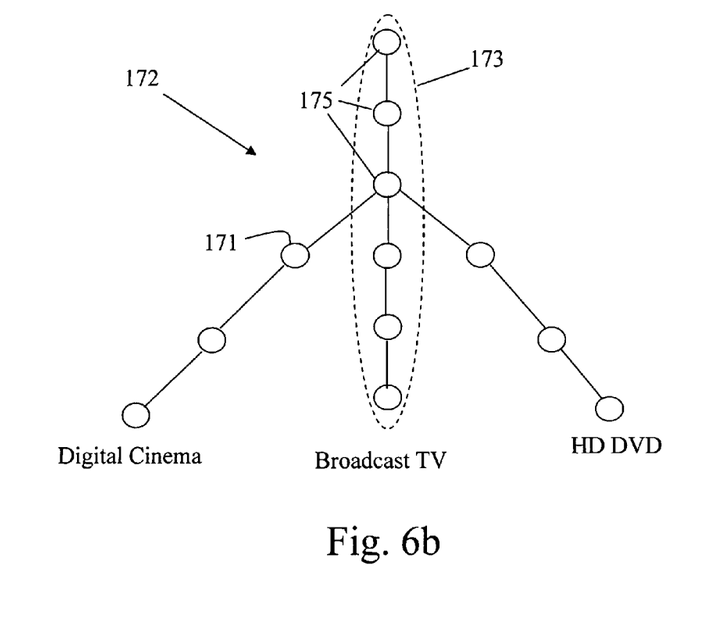

In an alternate embodiment for authoring and distributing content, the stored codestream is not updated after each post-processing task. As shown in FIGS. 6a and 6b, the original codestream 112 is maintained and the decision lists are stored (step 170) as nodes 171 in a decision tree 172 as they are created along branches 173 for different exhibition formats. For example, the cuts for film, HD DVD and broadcast TV may be different. The color correction for film and digital exhibition on TV is also different. The tradeoff is that the post-processing tasks along a branch 173 in the tree must be applied to the rendered proxy (step 174), possibly in real-time, for the "current" post-processing task to be carried out. Note, only those post-processing tasks that overlap spatially with the rendered proxy must be applied. In another embodiment, the common post-processing tasks (common nodes 175) are applied to the codestream (step 176). The separated branches 173 including the non-common nodes are stored (step 170) and applied to the rendered proxies as needed.

Figure 7:
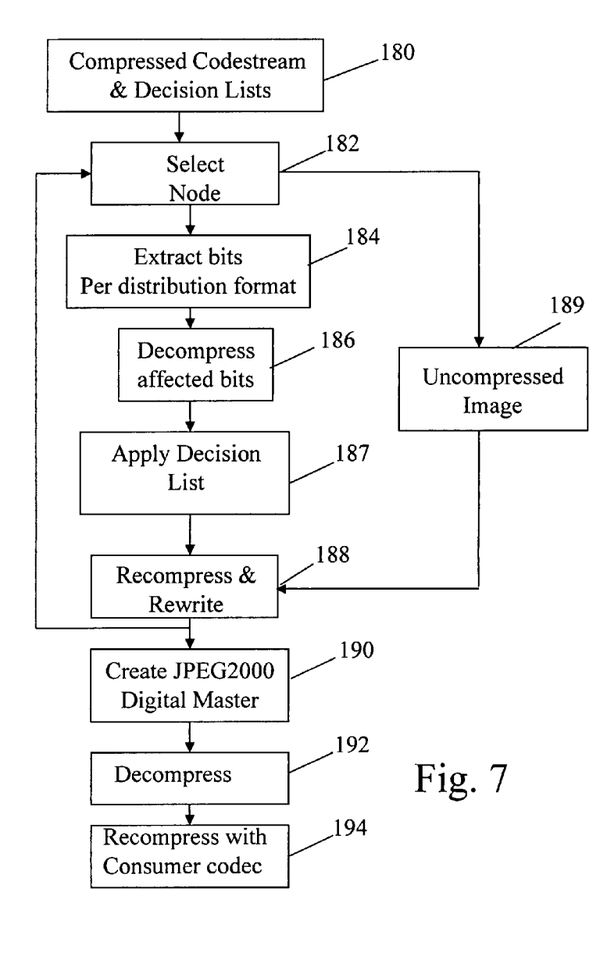

As shown in FIG. 7, storing some or all of the decision lists for different media separately from the compressed codestream provides considerable flexibility in the creation of multiple digital distribution masters. In this case the Digital Master is comprised of the compressed codestream and decision tree 180; either the original codestream and the entire tree or a codestream with common nodes already applied together with the unique branches. For a given exhibition format, the decision lists corresponding to the nodes along a given branch in the tree are applied sequentially to the codestream. The first node is selected (step 182) and packets are extracted based on the distribution format (step 184). The bits from the affected spatial regions are decompressed (step 186) and the decision list for the selected node is applied to perform the operations (step 187). Thereafter, the processed bits are recompressed and inserted back into the codestream, e.g. rewritten (step 188). This process is repeated to create a media specific JPEG2000 digital master (step 190). Alternately, it may be possible to extract the regions affected by all the decision lists, decompress, apply all the decisions lists and recompress using JPEG2000 or the target output codec. A full decompress and recompress on the entire image may be performed if so desired. The digital master can be reduced as described above to create a JPEG2000 digital distribution master or decompressed (step 192) and recompressed with a different codec such as MPEG or WM-9 (step 194). Alternately, beginning with the compressed codestream and decision lists 180, all data can be decompressed, the appropriate decision lists applied, followed by recompression with JPEG2000 or a different codec. In another embodiment, the decision lists in a particular tree (step 182) can be applied to the original uncompressed image (step 189) and compressed (step 188) to form the Digital Master.

As described above, in certain embodiments post-processed pixel data are compressed and formed into packets and written back to the JPEG2000 codestream. Generally, the length of the relevant packets will differ from that prior to post-processing. Consequently, the post processed codestream can be generated by either (a) rewriting all or substantially all of the codestream or (b) forcing the portion of modified data to have the same length as the corresponding original portion of stored data. In case (b), the post processed codestream can be created by merely overwriting the modified portions of the codestream.

Figure 8:
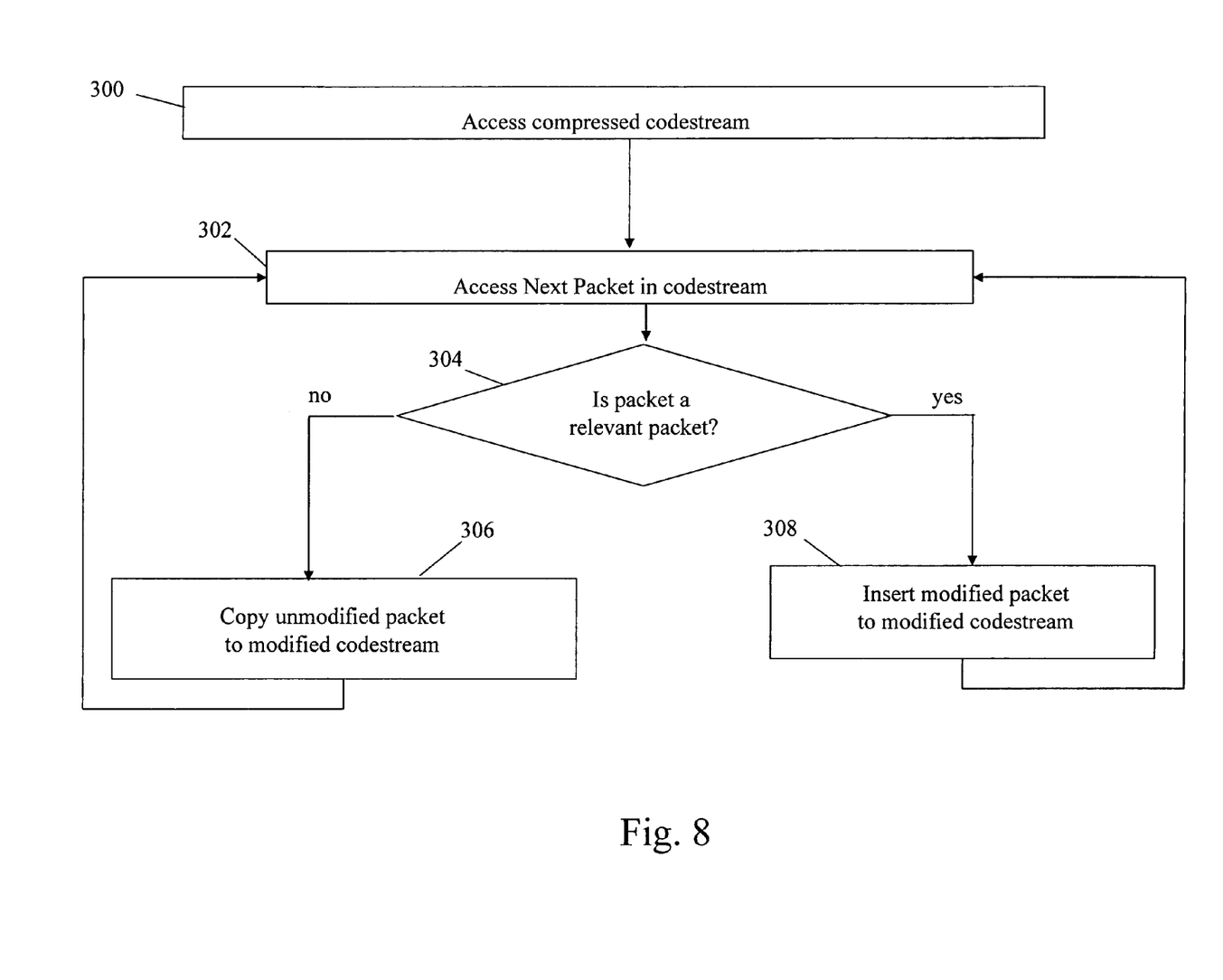
FIG. 8 is a flowchart for rewriting a post-processed codestream with variable length data.

In case (a), no packets outside those being post-processed need to be modified. Non post-processed packets can be merely copied to the newly edited codestream. The process of rewriting the codestream is shown in FIG. 8. In that figure, each unmodified packet is copied from the unedited compressed codestream to the modified compressed codestream, replacing modified packets where appropriate. Specifically, starting at the beginning of the compressed codestream (step 300), each packet is accessed in turn (step 302) and tested to determine its relevancy (step 304). If the packet is not relevant to the post-processing (the packet is unmodified), it is copied directly to the (new) modified codestream (step 306). If the packet is relevant, the unmodified packet is discarded, and the modified version of the packet is inserted into the modified codestream (step 308).

Figure 9:
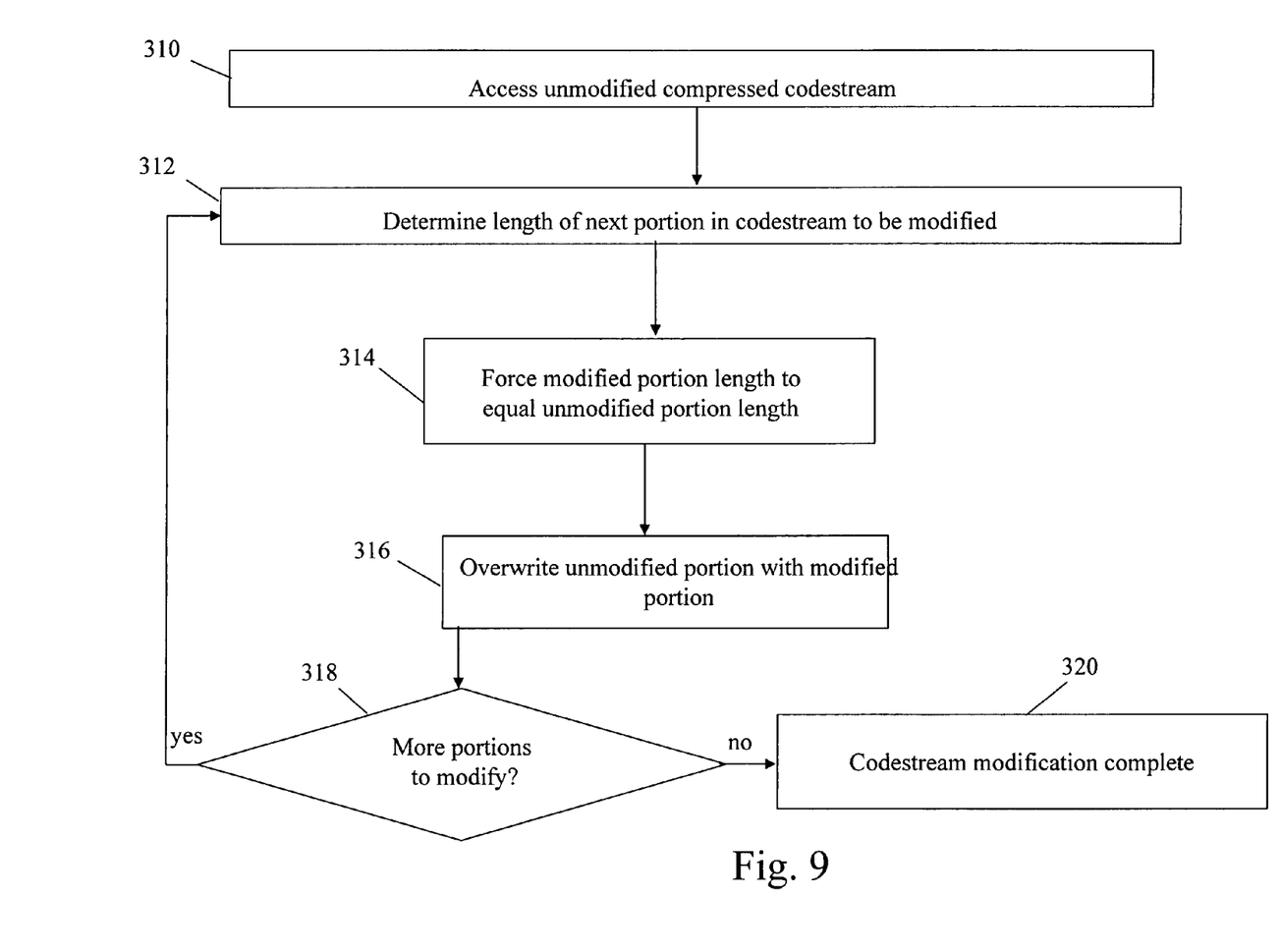
FIG. 9 is a flowchart for rewriting a post-processed codestream with fixed length data.
Figure 10:
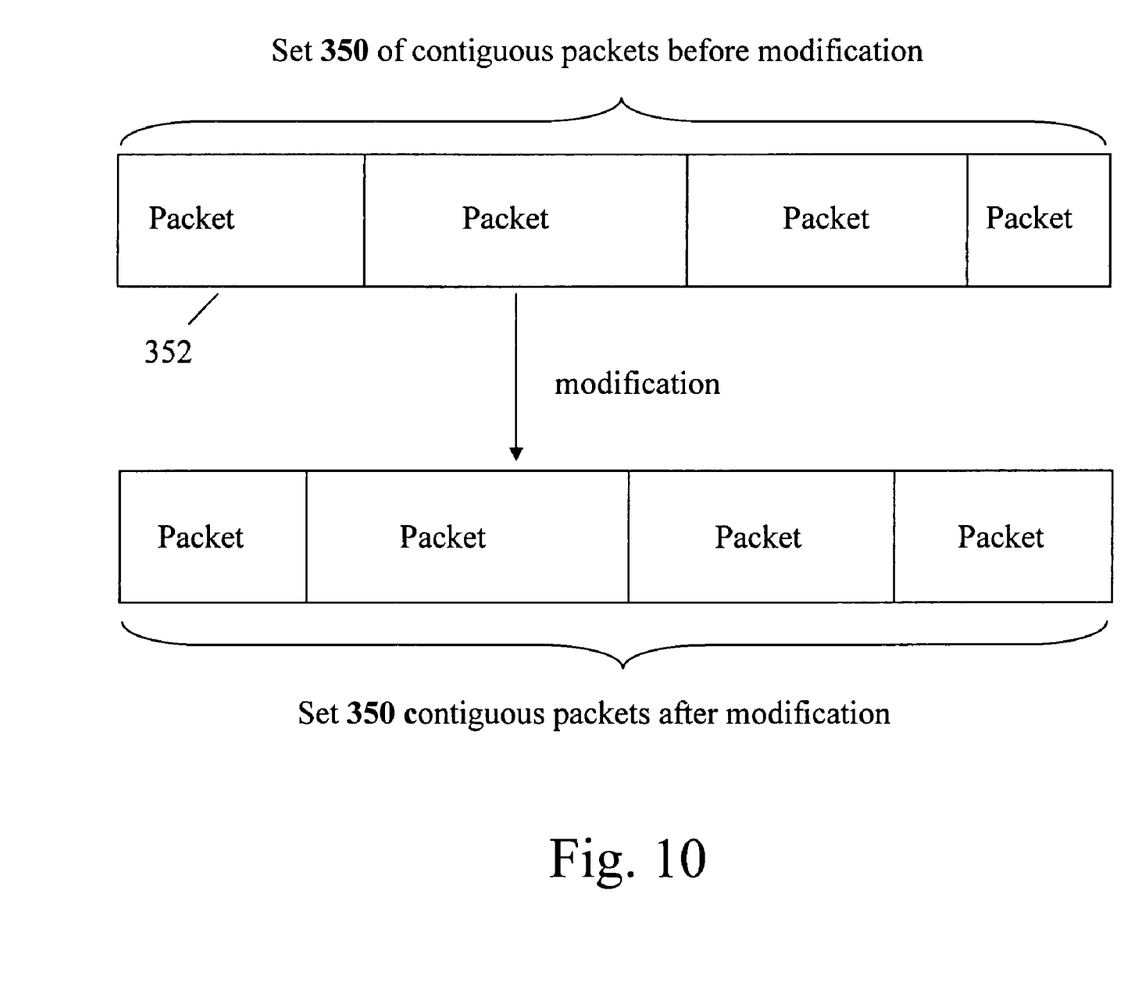
FIG. 10 is a diagram for fixing the length of post-processed data to that of the compressed codestream.

In the second case (b) as shown in FIG. 9, the input/output requirements can be reduced by avoiding substantial rewriting of the codestream. This can accelerate processing speeds even further. As shown in FIG. 10, the unmodified compressed codestream is accessed (step 310). The length is determined for the first portion of the codestream to be modified (step 312). The corresponding modified portion of the codestream is forced to have this same length (step 314). The unmodified portion is then overwritten by the modified portion (step 316). This process is repeated for each portion of the codestream that needs modification (step 318) until the process is complete (step 320).

If a modified portion of the codestream is limited to a single packet, then the modified packet must be the same length as the unmodified packet it replaces. On the other hand, if a modified portion of the codestream affects multiple contiguous packets, then only the total length of the modified packets together need equal the total length of the unmodified packets. Specifically, the individual modified packet lengths can vary from those of their unmodified counterparts. This situation is depicted in FIG. 10.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of digital intermediate (DI) processing, comprising: using a computer to implement the steps of
   a) providing a scalable compressed codestream for a sequence of uncompressed digital images, said codestream providing random access to packets of compressed data to extract spatial regions of the images at a plurality of resolutions and/or a plurality of quality levels;
   b) in response to a client request for certain images in the sequence in a spatial region at a reduced resolution and/or reduced quality level, extracting the appropriate packets from the compressed codestream;
   c) decompressing data from the packets to reconstruct and dynamically render a proxy image;
   d) post-processing the proxy image to create a decision list of operations performed on the proxy image;
   e) repeating steps b through d for a plurality of post-processing functions on one or more proxy images; and
   f) applying the decision lists to the sequence of uncompressed digital images.

2. The method of claim 1, further comprising:
Compressing the sequence of uncompressed digital images to provide a post-processed scalable compressed codestream.

3. The method of claim 1, further comprising:
Applying said decision list to the compressed codestream at each iteration.

4. The method of claim 3, wherein the decision list is applied to the compressed codestream by extracting packets including packets used to render the proxy image and additional packets for resolution and/or quality levels not rendered in the proxy image.

5. The method of claim 1, further comprising:
applying the relevant decision lists to the decompressed data when rendering the proxy image.

6. The method of claim 1, further comprising discarding the processed proxy image once the decision list is created.

7. The method of claim 1, wherein the spatial region is extracted up to and including the full extent of the image at less than the full resolution and less than highest compressed quality of the image.

8. A system for remote post-processing of digital images, comprising:
a central server configured to store a scalable compressed codestream for a sequence of uncompressed digital images, and in response to a client request said server configured to extract and transmit packets of compressed data to extract a spatial region of one or more images up to and including the full extent of the image at a reduced resolution and/or a reduced quality level; and
at least one remote client workstation configured to issue the client request, receive and decompress data from the packets to reconstruct and dynamically render a proxy image, post-process the proxy image to create a decision list of operations performed on the proxy image, and transmit the decision list back to the central server,
said central server applying a master decision list formed from the decision lists transmitted by each said remote client workstations to the sequence of uncompressed digital images and than compressing the digital images to form a post-processed scalable compressed codestream.

9. The system of claim 8, wherein the server extracts only the packets that are required to render the proxy image from the compressed codestream.

10. The system of claim 8, wherein the remote client workstations discard the proxy images once the decision list is created.

11. The system of claim 8, wherein the central server transmits relevant decision lists with the data packets for the extracted spatial region, said client workstation applying the decision lists to the decompressed data when rendering the proxy image.

12. A method of digital intermediate (DI) processing, comprising: using a computer to implement the steps of
   a) providing a scalable compressed codestream for a sequence of digital images, said codestream providing random access to packets of compressed data to extract spatial regions of the images up to and including the full extent of the image at a plurality of resolutions and/or a plurality of quality levels up to and including the full resolution and highest compressed quality of the image;
   b) in response to a client request for certain images in the sequence in a spatial region at a reduced resolution and/or reduced quality level, extracting the appropriate packets from the compressed codestream;
   c) decompressing data from the packets to reconstruct and dynamically render a proxy image; and
   d) post-processing the proxy image to create a decision list of operations performed on the proxy image.

13. The method of claim 12, wherein the requested spatial region is the full extent of the image.

14. The method of claim 12, wherein the requested spatial region is less than the full extent of the image.

15. The method of claim 12, wherein the requested resolution is less than the full resolution.

16. The method of claim 12, wherein the scalable compressed codestream is a JPEG-2000 codestream.

17. A system for post-processing of digital images, comprising:
storage configured to store a scalable compressed codestream for a sequence of digital images, and in response to a client request said storage configured to provide packets of compressed data to extract a spatial region of one or more images up to and including the full extent of the image at a specified reduced resolution and/or a specified reduced quality level; and
a client workstation configured to issue the client request, receive and decompress data from the packets to reconstruct and dynamically render a proxy image and post-process the proxy image to create a decision list of operations performed on the proxy image.

18. The system of claim 17, wherein the client workstation issues the client request for a spatial region that is the full extent of the image.

19. The system of claim 17, wherein the client workstation issues the client request for a spatial region that is the full extent of the image.

20. The system of claim 17, wherein the scalable compressed codestream is a JPEG-2000 codestream.

21. The system of claim 17, wherein the storage is remotely located in a central server.

22. The system of claim 21, wherein in response to an initial client request for at least one scene comprising a plurality of images, said storage is configured to transmit the packets for said scene at a reduced resolution and/or reduced quality level, said remote client workstation configured to store said scene locally and for subsequent client requests to extract a spatial region up to and including the full extent of the image at a further reduced resolution and/or further reduced quality level the packets are extracted locally.

23. The system of claim 17, wherein the storage is configured to extract only the packets that are required to render the proxy image from the compressed codestream.

* * * * *